(12) United States Patent
Larason et al.

(10) Patent No.: US 7,359,899 B2
(45) Date of Patent: Apr. 15, 2008

(54) DETERMINING A RATING FOR A COLLECTION OF DOCUMENTS

(75) Inventors: John Todd Larason, Aloha, OR (US); Alan J. Packer, Portland, OR (US)

(73) Assignee: Microsoft Corporation, Redmond, WA (US)

( * ) Notice: Subject to any disclaimer, the term of this patent is extended or adjusted under 35 U.S.C. 154(b) by 145 days.

(21) Appl. No.: 11/130,595

(22) Filed: May 16, 2005

(65) Prior Publication Data

US 2005/0278363 A1    Dec. 15, 2005

Related U.S. Application Data

(62) Division of application No. 09/921,230, filed on Aug. 1, 2001, now Pat. No. 6,978,266.

(60) Provisional application No. 60/289,587, filed on May 7, 2001, provisional application No. 60/289,400, filed on May 7, 2001, provisional application No. 60/289,418, filed on May 7, 2001.

(51) Int. Cl.
*G06F 17/30* (2006.01)

(52) U.S. Cl. .............. 707/5; 707/3; 707/10; 707/100; 707/7

(58) Field of Classification Search ............ None
See application file for complete search history.

(56) References Cited

U.S. PATENT DOCUMENTS

| | | |
|---|---|---|
| 4,991,094 A | 2/1991 | Fagan et al. |
| 5,461,698 A | 10/1995 | Schwanke et al. |
| 5,640,468 A | 6/1997 | Hsu |
| 5,652,829 A | 7/1997 | Hong |
| 5,657,424 A | 8/1997 | Farrell et al. |
| 5,706,507 A | 1/1998 | Schloss |
| 5,708,822 A | 1/1998 | Wical |
| 5,724,567 A | 3/1998 | Rose et al. |
| 5,734,796 A | 3/1998 | Pao |
| 5,768,580 A | 6/1998 | Wical |
| 5,809,499 A | 9/1998 | Wong et al. |
| 5,812,995 A | 9/1998 | Sasaki et al. |

(Continued)

FOREIGN PATENT DOCUMENTS

DE    10024733 A1    11/2001

(Continued)

OTHER PUBLICATIONS

"Look Ahead Filtering of Internet Content," IBM Technical Disclosure Bulletin, vol. 40, No. 12, Dec. 1, 1997, pp. 143, New York, U.S.A.

(Continued)

*Primary Examiner*—Cam Y T Truong
(74) *Attorney, Agent, or Firm*—Senniger Powers

(57) ABSTRACT

On one or more data processing systems, a collection rating is determined for a rating scale for contents of a document collection. A link rating is determined for the rating scale for contents linked to or linked by contents of the document collection. The collection rating for the rating scale for contents of the document collection is then modified, based on the determined link rating for the rating scale for contents linked to or linked by contents of the document collection.

15 Claims, 3 Drawing Sheets

U.S. PATENT DOCUMENTS

| | | | |
|---|---|---|---|
| 5,835,905 A * | 11/1998 | Pirolli et al. | 707/3 |
| 5,867,799 A | 2/1999 | Lang et al. | |
| 5,870,744 A * | 2/1999 | Sprague | 707/9 |
| 5,911,043 A * | 6/1999 | Duffy et al. | 709/203 |
| 5,920,864 A | 7/1999 | Zhao | |
| 6,006,221 A | 12/1999 | Liddy et al. | |
| 6,018,733 A | 1/2000 | Kirsch et al. | |
| 6,055,540 A | 4/2000 | Snow et al. | |
| 6,058,205 A | 5/2000 | Bahl et al. | |
| 6,073,137 A | 6/2000 | Brown et al. | |
| 6,101,515 A | 8/2000 | Wical | |
| 6,128,613 A | 10/2000 | Wong et al. | |
| 6,161,130 A | 12/2000 | Horvitz et al. | |
| 6,163,778 A * | 12/2000 | Fogg et al. | 707/10 |
| 6,233,575 B1 | 5/2001 | Agrawal et al. | |
| 6,249,785 B1 * | 6/2001 | Paepke | 707/5 |
| 6,252,988 B1 | 6/2001 | Ho | |
| 6,266,664 B1 | 7/2001 | Russell-Falla et al. | |
| 6,285,999 B1 * | 9/2001 | Page | 707/5 |
| 6,334,131 B2 | 12/2001 | Chakrabarti et al. | |
| 6,353,825 B1 | 3/2002 | Ponte | |
| 6,389,436 B1 | 5/2002 | Chakrabarti et al. | |
| 6,430,558 B1 | 8/2002 | Delano | |
| 6,473,753 B1 * | 10/2002 | Katariya et al. | 707/4 |
| 6,507,843 B1 | 1/2003 | Dong | |
| 6,519,580 B1 | 2/2003 | Johnson et al. | |
| 6,592,627 B1 | 7/2003 | Agrawal et al. | |
| 6,604,114 B1 | 8/2003 | Toong et al. | |
| 6,606,659 B1 | 8/2003 | Hegli et al. | |
| 6,684,254 B1 | 1/2004 | Dutta | |
| 2001/0032029 A1 | 10/2001 | Kauffman | |
| 2001/0042085 A1 | 11/2001 | Peairs et al. | |
| 2002/0059221 A1 | 5/2002 | Whitehead et al. | |
| 2002/0099730 A1 | 7/2002 | Brown et al. | |
| 2002/0120754 A1 | 8/2002 | Anderson et al. | |
| 2002/0152222 A1 | 10/2002 | Holbrook | |
| 2003/0195872 A1 | 10/2003 | Senn | |
| 2005/0240618 A1 * | 10/2005 | Nickerson et al. | 707/102 |

FOREIGN PATENT DOCUMENTS

| | | |
|---|---|---|
| EP | 1076299 A2 | 2/2001 |
| WO | WO 00/68833 A2 | 11/2000 |
| WO | WO 01/33413 A1 | 5/2001 |

OTHER PUBLICATIONS

Oh et al., A Practical Hypertext Categorization Method Using Links and Incrementally Available Class Information, Jul. 24, 2000, vol. 34, pp. 264-271, U.S.A.

Qiu et al., "Using Link Types in Web Page Ranking and Filtering," Web Information Systems Engineering, 2001, Proceedings of the Second International Conference, vol. 1, Dec. 3, 2001, pp. 311-320.

Soumen et al., "Enhanced Hypertext Categorization Using Hyperlinks," Sigmod Record, Jun. 1998, vol. 27, No. 2, pp. 307-318, Croatian Soc. Chem. Eng., Croatia.

* cited by examiner

DETERMINING A RATING FOR A COLLECTION OF DOCUMENTS

This application claims priority to provisional application Nos. 60/289,587, 60/289,400 and 60/289,418, all filed on May 7, 2001, entitled "Method of Assigning Ratings to Collections of Related Objects", "Method and Apparatus for Automatically Determining Salient Features for Object Classification" and "Vvery-Large-Scale Automatic Categorizer For Web Content" respectively having at least partial common inventorship as the present application.

This is a divisional application of co-pending application Ser. No. 09/921,230, filed Aug. 1, 2001, now U.S. Pat. No. 6,978,266, entitled Determining A Rating For A Collection of Documents.

BACKGROUND OF THE INVENTION

1. Field of the Invention

The present invention relates to the field of data processing. More specifically, the present invention relates to automated methods and systems for determining a rating for a rating scale for a collection of documents.

2. Background Information

The World Wide Web (WWW) is an expanding collection of textual and non-textual material which is available for access to any Internet user, from any location at any time. Some users find particular contents to be objectionable. For example, parents often wish to shield their children from exposure to sexually explicit material, hate speech, and drug information. Similarly, companies may wish to prevent access by employees to web sites that provide or support gambling.

Notwithstanding the civil liberty implications associated with these concerns, a number of groups and companies have brought forward systems and techniques for assisting Internet users in block accessing to undesired content. For example, various blocking software products are available from software vendors, such as SafeSurf of Newbury Park, Calif., and NetNanny of Bellevue, Wash. Typically, these products employ site lists to effectuate blocking of access to undesired contents. These site lists include the identifications of the web sites containing undesired contents. Access to any of the web pages hosted by the identified web sites is blocked. Another example of such a system is described by Neilsen et al., "Selective downloading of file types contained in hypertext documents transmitted in a computer controlled network", U.S. Pat. No. 6,098,102, which utilizes the file extensions of URLs to determine whether the particular files will or will not be downloaded to the user. Still another method for controlling access to web sites is typified by the work of the Internet Content Rating Association, which uses the technology of the Platform for Internet Content Selection (PICS) specification to allow voluntary, or in the future potentially mandatory, rating of page content by the content author. Filtering can then be done by utilizing these rating "tags", and may be augmented by a complete block on other un-rated pages.

These prior art approaches suffer from at least the following disadvantages:

a) The WWW is constantly growing. The number of web sites and their contents are constantly changing. As a result, the prior art approaches are unable to keep pace with the changes.

b) Further, many web sites generate user-specific pages at every access. As a result, the prior art URL based approaches are unable to facilitate blocking of these dynamically generated pages if they contain undesired contents.

c) Additionally, content providers are often not the best, or even the appropriate, agent for rating their own contents. Duplicitous providers may deliberately mis-rate the appropriateness of their contents.

Some filtering systems rely on key word lists or text analysis, to judge the content of individual pages. While these systems may work satisfactorily on text files, they are ineffective for non-text materials, such as images, sound files, or movies.

Thus, an improved approach for blocking undesired contents is desired.

SUMMARY OF THE INVENTION

On one or more data processing systems, a collection rating is determined for a rating scale for contents of a document collection. A link rating is determined for the rating scale for contents linked to or linked by contents of the document collection. The collection rating for the rating scale for contents of the document collection is then modified, based on the determined link rating for the rating scale for contents linked to or linked by contents of the document collection.

In one embodiment, a collection rating for a rating scale for a document collection is determined based on document ratings of a subset of the documents of the document collection, and their sizes.

In one embodiment, the link rating for the rating scale for the document collection is determined based on the collection ratings of the document collections having contents linked to or linked by contents of the document collection.

In one embodiment, the document collection is a web site, the documents of the document collection are web pages of the web site, and the subset of documents employed to determine the web site rating is the textual documents.

Note: The term "document" as used herein in this application, including the specification and the claims, includes textual as well as non-textual documents, unless one or more types of "documents" are expressly excluded or implicitly excluded in view of the context of the usage.

BRIEF DESCRIPTION OF DRAWINGS

The present invention will be described by way of exemplary embodiments, but not limitations, illustrated in the accompanying drawings in which like references denote similar elements, and in which.

GLOSSARY

URL—Uniform Resource Locator

DETAILED DESCRIPTION OF THE INVENTION

As summarized earlier, the present invention includes improved methods and related apparatuses for determining a rating for a rating scale for a document collection. In the description to follow, various aspects of the present invention will be described. However, the present invention may be practiced with only some or all aspects of the present invention. For purposes of explanation, specific numbers, materials and configurations are set forth in order to provide a thorough understanding of the present invention. However, the present invention may be practiced without some of the specific details. In other instances, well known features are omitted or simplified in order not to obscure the present invention.

Parts of the description will be presented in terms of operations performed by a processor based device, using terms such as data, analyzing, assigning, selecting, determining, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device. The term "processor" includes microprocessors, micro-controllers, digital signal processors, and the like, that are standalone, adjunct or embedded.

Various operations will be described as multiple discrete steps in turn, in a manner that is most helpful in understanding the present invention. However, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
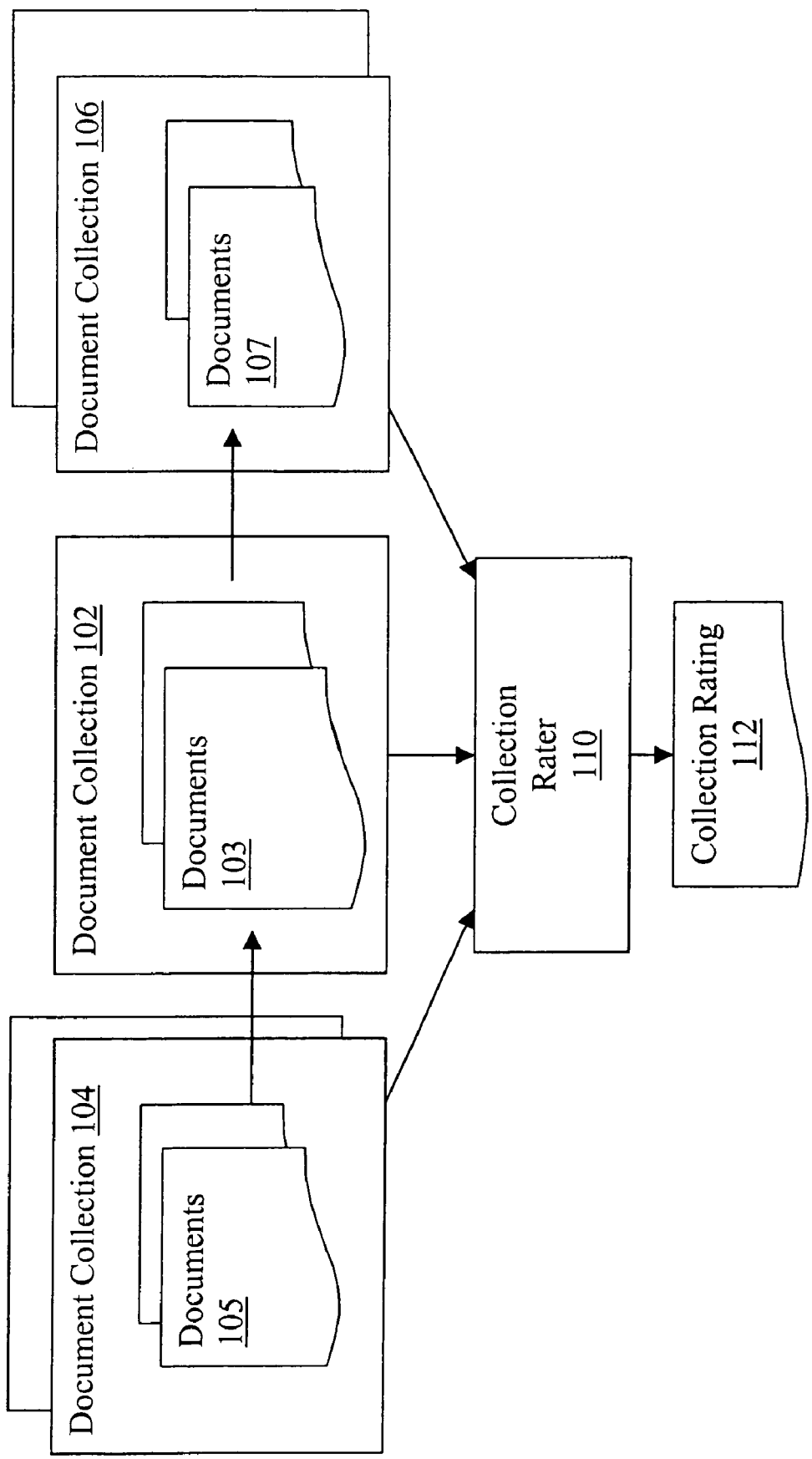
FIG. 1 illustrates an overview of the present invention in accordance with one embodiment.

Referring now to FIG. 1, wherein a block diagram illustrating an overview of the present invention, in accordance with one embodiment, is shown. As illustrated, collection rater 110 of the present invention, is equipped to deduce a collection rating 112 for a rating scale for a document collection, such as collection 102. An example of a rating scale is a scale that quantitatively rates the contents of a subject collection on its "offensiveness", e.g. ranging from 0 to 3, with 0 meaning "not offensive", 1 meaning "mildly offensive", 2 meaning "moderately offensive" and 3 meaning "very offensive". As will be described in more detail below, collection rater 110 advantageously generates collection rating 112 for a collection taking in account not only the contents of the collection, but also contents of other collections linked to or linked by contents of the subject collection, such as collection 104 and collection 106 respectively. As those skilled in the art would appreciate, the inclusion of the contents linked to or linked by contents of the subject collection tends to strengthen the accuracy of the rating generated for the subject collection.

In one embodiment, collections 102, 104 and 106 are web sites, and documents 103, 105 and 107 are web pages of the web sites, including textual as well as non-textual, such as multi-media, web pages. In alternate embodiments, documents 103, 105 and 107 may be other content objects, with collections 102, 104 and 106 being other organizational entities of the content objects.

Method

Figure 2:
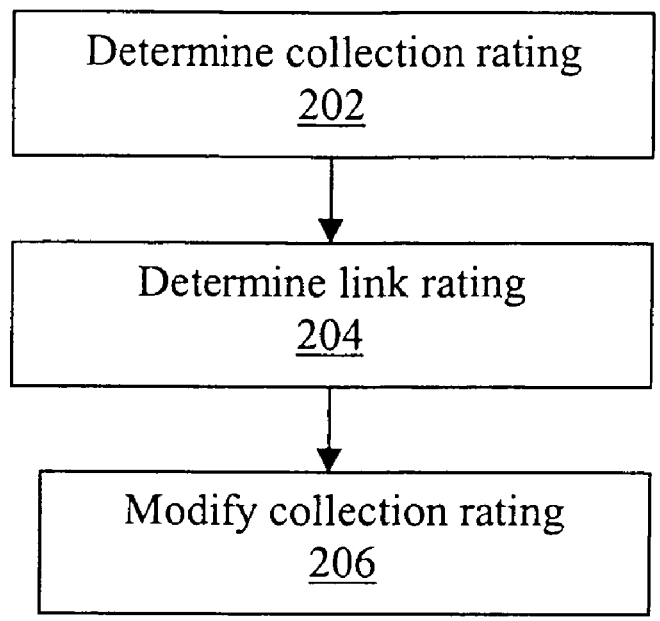
FIG. 2 illustrates a method view of the present invention, in accordance with one embodiment.

Referring now to FIG. 2, wherein a block diagram illustrating a method view of the present invention, in accordance with one embodiment, is shown. As illustrated, for the embodiment, collection rater 110 generates a collection rating for rating scale for a subject collection, by first determining an initial collection rating for the contents of the subject collection, block 202. Upon so determining, collection rater 110 determines a link rating for the contents of the linked collections, i.e. collections with contents linked to or linked by contents of the subject collection, block 204. Thereafter, for the illustrated embodiment, collection rater 110 modifies the initially determined collection rating, using the determined link rating, thereby taking into consideration the "linked" contents, block 206.

In one embodiment, in block 206, collection rater 110 modifies the initially determined collection rating by replacing the initially determined collection rating with the determined link rating. In another embodiment, in block 206, collection rater 110 modifies the initially determined collection rating by adding the determined link rating to the initially determined collection rating. In yet another embodiment, in block 206, collection rater 110 modifies the initially determined collection rating by subtracting the determined link rating from the initially determined collection rating. In yet other embodiments, in block 206, collection rater 110 may modify the initially determined collection rating by combining the determined link rating with the initially determined collection rating in other alternate manners.

The manner in which the determined link rating is to be combined with the initially determined collection rating to modify the initially determined collection rating to take into account the linked contents is application dependent. Preferably, the manner of combination is user configurable. Such user configuration may be facilitated through any one of a number of user configuration techniques known in the art, which are all within the abilities of those ordinarily skilled in the art. Accordingly, no further description of these user configuration techniques is necessary.

Collection Rating

Figure 3:
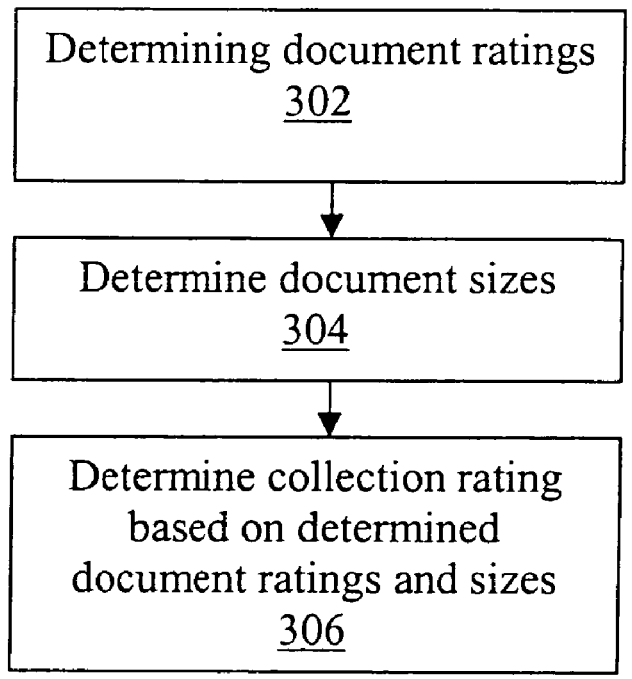
FIG. 3 illustrates the operational flow for determining a collection rating, in accordance with one embodiment.

Referring now to FIG. 3, wherein a block diagram illustrating a manner collection rater 110 generates a collection rating for a rating scale for a subject collection, in accordance with one embodiment, is shown. As illustrated, for the embodiment, collection rater 110 generates the collection rating for a rating scale for a subject collection by first determining the individual document ratings for a subset of the documents of the subject collection, block 302. In one embodiment, the subject collection comprises textual as well as non-textual, such as multi-media, documents. For the embodiment, the subset of the documents is the textual documents. The determination of the individual document ratings for the textual documents may be made in accordance with any one of a number of document rating techniques, e.g. by the salient features or keywords of each of the document. Examples of these document rating techniques include but are not limited to those described in U.S. Provisional Applications Nos. 60/289,400 and 60/289,418, entitled "METHOD AND APPARATUS FOR AUTOMATICALLY DETERMINING SALIENT FEATURES FOR OBJECT CLASSIFICATION" and "VERY-LARGE-SCALE AUTOMATIC CATEGORIZER FOR WEB CONTENT" respectively, both filed on May 7, 2001. Both applications are hereby fully incorporated by reference.

In accordance with the present invention, in addition to determining the individual document ratings of the subset of the documents, collection rater 110 further determines the sizes of the documents, block 304. Then, collection rater 110 determines the collection rating by combining the determined individual document ratings in a size and rating normalized manner, block 306.

More specifically, in one embodiment, collection rater 110 combines the determined individual document ratings in a size and rating normalized manner, by grouping the documents in accordance with their determined sizes and determined ratings, and applying weights to the determined document ratings in accordance with their size group and rating group membership. In one embodiment, the weights are applied in accordance with the group sizes and determined ratings as set forth by the tables below:

| Document size range in (bytes) | Weight |
|---|---|
| <500 | 1 |
| 500-999 | 4 |
| 1000-4999 | 7 |
| 5000-9999 | 10 |
| >9999 | 13 |

| Determined document rating for said rating scale | Weight |
|---|---|
| 0 | −0.5 |
| 1 | 0.5 |
| 2 | 3 |
| 3 | 6 |

The weights are applied in accordance with the formula set forth below:

$$CR = \frac{\sum_{i,j} r_i w_j \log(N_{ij} + 1)}{\sum_{i,j} w_j \log(N_{ij} + 1)}$$

where

CR is the collection rating for the rating scale;

$r_i$ is the weight applied for document rating group i;

$w_j$ is the weight applied for document size group j;

$N_{ij}$ is the number of pages in the collection with document rating i and having group sizes j for the rating scale.

In alternate embodiments, for different rating scales, different rating and/or group size based weighting schemes, as well as other weighting schemes may be employed instead.

Link Rating

Figure 4:
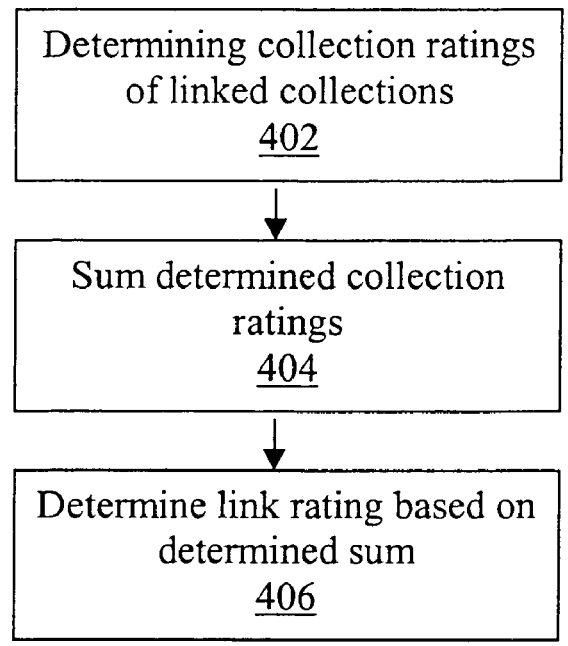
FIG. 4 illustrates the operational flow for determining a link rating, in accordance with one embodiment.

Referring now to FIG. 4, wherein a block diagram illustrating a manner collection rater 110 generates a link rating for a rating scale for a subject collection, in accordance with one embodiment, is shown. As illustrated, for the embodiment, collection rater 110 generates the link rating for a rating scale for a subject collection by first generating the collection ratings for the collections having contents either linked to or linked by contents of the subject collection, block 402. The collection rating for the rating scale for each of the collection with contents either linked to or linked by contents of the subject collection, may be generated in the same manner the collection rating for the rating scale for the subject collection is generated, e.g. as earlier described, or in a different manner.

Upon so determining, for the illustrated embodiment, collection rater 110 sums the determined collection ratings for the rating scale for the other collections, block 404, then generates the link rating based on the resulting sum, block 406. In one embodiment, collection rater 110 generates the link rating based on the resulting sum in accordance with the discrete "step" function set forth below:

| The resulting sum (RS) | link rating |
|---|---|
| RS less than −2 | −1.0 |
| RS greater than or equal to −2, but less than −1 | −0.5 |
| RS greater than or equal to −1, but less than or equal to −0.5 | 0 |
| RS greater than −0.5, but less than or equal to 1.5 | 0.5 |
| RS greater than 1.5, but less than or equal to 3 | 1.0 |
| RS greater than 3, but less than or equal to 4 | 1.5 |
| RS greater than 4 | 2.0 |

In alternate embodiments, the link rating may be generated from the determined collection ratings of the "linked" collections employing different functions.

Accordingly, under the present invention, "linked" contents are taken into consideration to potentially strengthen the accuracy of the rating generated for a rating scale for a subject collection. As those skilled in the art would appreciate, the present invention may be practiced for one or more rating scales on one or more subject collections, each having zero or more "linked" collections. Subject collections with zero "linked" collection is merely a degenerate case where no "linked" content contribution can be extracted to potentially strengthen the accuracy of the ratings generated for the rating scales for the subject collections.

Example Computer System

Figure 5:
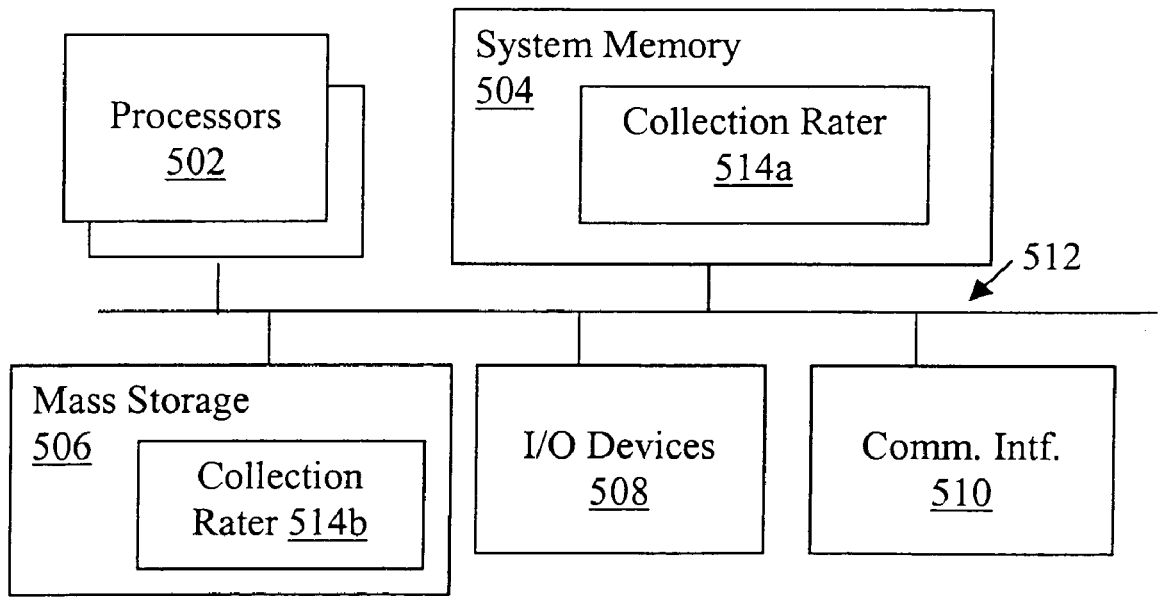
FIG. 5 illustrates a computer system suitable for use to practice the present invention, in accordance with one embodiment.

FIG. 5 illustrates an exemplary computer system 500 suitable for use to practice the present invention, in accordance with one embodiment. As shown, computer system 500 includes one or more processors 502 and system memory 504. Additionally, computer system 500 includes one or more mass storage devices 506 (such as diskette, hard drive, CDROM and so forth), one or more input/output devices 508 (such as keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown). Each of these elements performs its conventional functions known in the art. In particular, system memory 504 and mass storage 506 are employed to store a working copy (514a) and a permanent copy (514b) of the programming instructions implementing the teachings of the present invention (collection categorizer). The permanent copy (514b) of the programming instructions may be loaded into mass storage 506 in the factory, or in the field, as described earlier, through a distribution medium (not shown) or through communication interface 510 (from a distribution server (not shown)). The constitution of these elements 502-512 are known, and accordingly will not be further described.

In alternate embodiments, the present invention may be practice on multiple systems sharing common and/or networked storage.

Modifications and Alterations

While the present invention has been described referencing the illustrated and above enumerated embodiments, the present invention is not limited to these described embodiments. Numerous modification and alterations may be made, consistent with the scope of the present invention as set forth in the claims to follow. Of course, the above examples are merely illustrative. Based on the above descriptions, many other equivalent variations will be appreciated by those skilled in the art.

CONCLUSION AND EPILOGUE

Thus, a method and apparatus for generating a collection rating for a document collection comprising textual and non-textual documents, has been described. Since as illustrated earlier, the present invention may be practiced with modification and alteration within the spirit and scope of the appended claims, the description is to be regarded as illustrative, instead of being restrictive on the present invention.

What is claimed is:

1. A computer-implemented method for determining a rating for a first collection of documents, the method comprising:
    determining a first collection rating according to a first rating scale, said first collection rating relating to a desirability of content of the documents of the collection;
    determining a first link rating according to said first rating scale, said first link rating relating to a desirability of content of another document, said content of another document linked with the content of a collection document;
    modifying said first collection rating based on said determined first link rating;
    wherein said determining of a first collection rating comprises determining said first collection rating based on document ratings of a first subset of documents of the first collection of documents, and sizes of the documents of the first subset of documents of first document collection; and
    wherein said determining of the first collection rating comprises computing the first collection rating according to said rating scale as follows:

$$CR = \frac{\sum_{i,j} r_i w_j \log(N_{ij} + 1)}{\sum_{i,j} w_j \log(N_{ij} + 1)}$$

where CR is collection rating for said rating scale;
    $r_i$ is a weight applied for document rating group i;
    $w_j$ is a weight applied for document size group j;
    $N_{ij}$ is a number of pages in a collection with document rating i and having group sizes j for said rating scale.

2. The method of claim 1, wherein said first subset of documents of said first document collection consists of first textual documents of said first document collection.

3. The method of claim 1, wherein said determining of a first link rating comprises determining at least a second collection rating relating to the desirability of the contents of at least a second document collection with documents linked with documents of said first document collection, and determining said first link rating based on said determined at least a second collection rating.

4. The method of claim 1, wherein said modifying of the first collection rating comprises replacing the determined first collection rating with said determined first link rating.

5. The method of claim 1, wherein said modifying of the first collection rating comprises adding said determined first link rating to the determined first collection rating or subtracting said determined first link rating from the determined first collection rating.

6. The method of claim 1, wherein said first document collection is a web site, and said contents of said first document collection are web pages.

7. A computer-implemented method for determining a rating for a collection of documents, the method comprising:
    determining document ratings according to a rating scale for a subset of documents of the document collection;
    determining document sizes of the documents of said subset;
    determining collection rating according to said rating scale, said collection rating being based on said determined document ratings of subset of documents and normalized by said determined document sizes of said subset of documents;
    said determining of the collection rating comprises further subdividing said subset of documents into a plurality of groups in accordance with their determined document sizes, and applying a weight to a document rating for each document of the subset in accordance to document's size group classification; and
    said determining of the collection rating comprises computing the collection rating according to said rating scale as follows:

$$CR = \frac{\sum_{i,j} r_i w_j \log(N_{ij} + 1)}{\sum_{i,j} w_j \log(N_{ij} + 1)}$$

where CR is the collection rating for said rating scale;
    $r_i$ is a weight applied for document rating group i;
    $w_j$ is a weight applied for document size group j;
    $N_{ij}$ is a number of pages in a collection with document rating i and having group sizes j for said rating scale.

8. The method of claim 7, wherein said determining of the collection rating comprises further subdividing said subset of documents into a plurality of groups in accordance with their determined ratings according to said rating scale, and applying a weight to the document rating determined for said rating scale for each document of the subset in accordance to the document's rate group classification.

9. The method of claim 7, wherein said first collection of documents are web pages of a web site, and said first subset of documents are textual documents of said web site.

10. A computer-implemented apparatus for determining a rating for a collection of documents, said apparatus comprising:
   storage medium having stored therein a plurality of programming instructions designed to enable said apparatus to
      determine a first collection rating according to a first rating scale, said first collection rating relating to a desirability of content of the documents of the collection,
      determine a first link rating according to said first rating scale, said first link rating relating to a desirability of content of another document, said content of another document linked with the content of a collection document, and
      modify said first collection rating based on said determined first link rating; and
   at least one processor coupled to the storage medium to execute the programming instructions;
   wherein said determining of the collection rating comprises subdividing a subset of documents into a plurality of groups in accordance with their document sizes, and applying a weight to a document rating for each document of the subset in accordance to document's size group classification; and
   said determining of the first collection rating comprises computing the first collection rating according to said rating scale as follows:

$$CR = \frac{\sum_{i,j} r_i w_j \log(N_{ij} + 1)}{\sum_{i,j} w_j \log(N_{ij} + 1)}$$

where CR is collection rating for said rating scale;
   $r_i$ is a weight applied for document rating group i;
   $w_j$ is a weight applied for document size group j;
   $N_{ij}$ is a number of pages in a collection with document rating i and having group sizes j for said rating scale.

11. The apparatus of claim 10, wherein said programming instructions are designed to enable the apparatus to perform said determining of a first collection rating by determining said first collection rating based on document ratings of a first subset of documents of said first collection of documents, and sizes of the documents of the first subset of documents of the first document collection.

12. The apparatus of claim 11, wherein said first subset of documents of said first document collection consists of first textual documents of said first document collection.

13. The apparatus of claim 10, wherein said programming instructions are designed to enable the apparatus to perform said determining of a first link rating by determining at least a second collection rating relating to the desirability of the contents of at least a second document collection with documents linked with documents of said first document collection, and determining said first link rating based on said determined at least a second collection rating.

14. The apparatus of claim 10, wherein said programming instructions are designed to enable the apparatus to perform said modifying of the first collection rating by replacing the determined first collection rating with said determined first link rating.

15. The apparatus of claim 10, wherein said programming instructions are designed to enable the apparatus to perform said modifying of the first collection rating by adding said determined first link rating to the determined first collection rating or subtracting said determined first link rating from the determined first collection rating.

* * * * *